United States Patent

Thompson et al.

Patent Number: 6,035,396
Date of Patent: *Mar. 7, 2000

[54] METHOD FOR SHARING A STORAGE MEDIUM BETWEEN COMPUTERS HAVING DISPARATE OPERATING SYSTEMS

[75] Inventors: David A. Thompson, South Ogden; Trent M. Thomas, Layton; Jim Sandman, Clinton; Thane S. Heninger, West Haven, all of Utah

[73] Assignee: Iomega Corporation, Roy, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/673,919

[22] Filed: Jul. 1, 1996

[51] Int. Cl.[7] .................................................. G06F 9/06
[52] U.S. Cl. .................................................. 713/2
[58] Field of Search ................... 395/651, 652, 395/500, 404, 438, 439; 711/205, 207; 713/1, 2; 707/205

[56] References Cited

U.S. PATENT DOCUMENTS

| | | |
|---|---|---|
| 5,136,711 | 8/1992 | Hugard et al. ................ 395/700 |
| 5,214,781 | 5/1993 | Miki et al. ................... 395/600 |
| 5,274,804 | 12/1993 | Jackson et al. ............... 395/600 |
| 5,359,725 | 10/1994 | Garcia et al. ................ 395/500 |
| 5,371,885 | 12/1994 | Letwin ........................ 395/600 |
| 5,542,082 | 7/1996 | Solhjell ....................... 395/442 |
| 5,608,905 | 3/1997 | Weinstein .................... 395/621 |
| 5,887,163 | 3/1999 | Nguyen et al. ............... 395/652 |

*Primary Examiner*—Alvin E. Oberley
*Assistant Examiner*—Sue Lao
*Attorney, Agent, or Firm*—Woodcock Washburn Kurtz Mackiewicsz & Norris LLP

[57] ABSTRACT

A disk can store data from two different operating systems, particularly DOS and MAC OS formats. The initial sector on the disk, sector zero, is divided between the operating systems, allowing two sector signatures. As a result, DOS recognizes the disk as valid and the MAC OS can support a driver on the disk. According to another aspect of the invention, the DOS portion of the dual-format disk is reclaimed by having a software program start its execution on the dual-format disk then switch its execution to another storage device. As a result, the program can dismount the dual-format disk and safely reclaim it for use on the MAC OS.

11 Claims, 7 Drawing Sheets

METHOD FOR SHARING A STORAGE MEDIUM BETWEEN COMPUTERS HAVING DISPARATE OPERATING SYSTEMS

FIELD OF THE INVENTION

This invention relates generally to sharing storage media between computers having disparate operating systems. In particular, this invention relates to a method of sharing data on a disk such that a portion of the disk is readable on Macintosh Operating System based computers and another portion of the disk is readable on Microsoft Disk Operating System based computers.

BACKGROUND OF THE INVENTION

The personal computer industry has witnessed the emergence of two competing operating systems—Macintosh Operating System (MAC OS) and Microsoft Disk Operating System/Windows (DOS). Not only is the software for each operating system incompatible with the other operating system, but also the file formats employed by the operating systems are incompatible. As is described more fully below, the differences in file formats has created a hindrance to the distribution of popular software programs. Briefly, a disk formatted for use by a MAC OS based computer cannot be read by all DOS based computers and vice-versa. As a result, separate media must be used to distribute software for each operating system. That is, until recently, a single disk would have had to contain information that was readable by either a MAC OS based computer or a DOS based computer, but could not contain both.

A particularly important example of the difficulties created by the disparate file formats is related to software distribution. Currently, a popular software distribution technique is to provide a user with a copy of a software program on a disk. The term "disk" as used herein refers to magnetic disks, CD-ROMs and the like. Generally, the disks are packaged in shrink wrapped boxes and supplied either alone or along with a piece of computer equipment that requires additional software support. Because the operating systems are incompatible, multiple versions of a software program must be created in order for a particular program to support multiple operating systems. Multiple software program versions force a compromise in software distribution techniques. One distribution option available is to provide two sets of disks in a single package—one set for each operating system version of a software program. However, such an option unnecessarily increases the cost of distribution by including an unwanted and unused set of disks with every package. Alternatively, each package could contain a set of disks having a software program version compatible with only one operating system. Two different packages would then be required—one for each operating system. Unfortunately, with this second option, the distributor must determine in advance the appropriate quantity of packages to make and stock for each operating system. This second option also increases cost by creating inventory management problems. For example, inaccurately determining the quantity of each version of software program to stock could result in insufficient inventory for one version or the other.

Even if a single format that is readable by both operating systems is available, a separate limitation has been caused by the capacity of the distribution media. Until recently, program sizes have outstripped the capacities of one of the most common forms of distribution media—floppy disks. For example, distribution via conventional floppy disks (e.g., 1.44 Megabytes) requires multiple disks to store a single software program. Furthermore, because each operating system requires a different version of a software program, even if the same floppy disks were readable by both DOS and MAC OS based computers, both software program versions would not fit on a single floppy disk. As a result, separate disks, one for each operating system version, would still be required. However, with the advent of higher capacity media, such as the IOMEGA ZIP cartridge, it has become possible to store two different versions of a software program on a single disk.

The applicants have recognized some of the capabilities offered by the increased storage capacity of the IOMEGA ZIP cartridge and have devised a technique for dividing a single disk between MAC OS and DOS and formatting each portion accordingly. Significantly, a DOS version of a software program can be stored on the DOS portion of the disk, and a MAC OS version of a program can be stored on the MAC portion of the disk. However, the technique employed has had the drawback of requiring the distribution of a separate conventional floppy disk for each operating system along with the dual-format disk. Thus, for example, a user desiring to read the MAC OS software from a dual-format ZIP cartridge would first insert a floppy disk and run a program to enable it to read the MAC OS formatted portion of the disk. Once the MAC OS portion was read, the DOS portion of the disk would be deleted and made available to MAC OS. A similar process was required on a DOS based computer.

Applicants have recognized that a method of reducing the number of distribution disks needed to distribute a typical software program would provide significant economic advantages when aggregated over a large volume of distribution disks required. Thus, there is a need for an improved dual-format disk and installation method that would reduce the number of distribution disks required for a typical software program.

SUMMARY OF THE INVENTION

The present invention is particularly well suited for use in MAC OS and DOS based computers. According to an aspect of the present invention, the method of preparing a storage device for simultaneous storage of information from two substantially incompatible operating systems comprises several steps. First, on a computer having a first operating system, such as DOS, a first operating system sector is written to the storage device such that said sector has a signature recognized by said first operating system. Furthermore, the first operating system sector written to the storage device has information necessary to locate files on the storage device. Second, on a computer having a second operating system, such as MAC OS, a second operating system sector is created such that the sector has a signature recognized by the second operating system and other information used by said second operating system. Third, the first operating system sector and the second operating system sector are merged into a dual-format sector. Finally, the dual-format sector is written to the storage device.

According to another aspect of the present invention, the method for reclaiming a disk, when the disk has information compatible with MAC OS and another operating system is introduced. In particular, the disk has a sector zero comprising aspects of both operating systems, such that the storage space on the disk previously reserved for the another operating system is made available for use by the MAC OS. First, a reclamation program is copied to another storage device and re-executes from that other storage location.

Second, the partition map is read to verify the dual-format status of the disk. Third, the disk is repartitioned such that a MAC OS sector zero is written to the disk. Finally, the directory structure is adjusted to reflect all available file space.

The presently preferred embodiment of the process of automatically copying the reclamation program comprises a set of steps. First, if the reclamation program is executing from the storage device to be reclaimed, a file reference is obtained for the reclamation program. If the reclamation program is executing from another storage location there is no need to copy it. Second, a folder is located on another storage device to which the reclamation program will be copied. Third, the reclamation program is copied to the folder on the other storage device. Finally, the reclamation program is executed from the new location and the first instance of the reclamation program quits.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENTS

Preferred embodiments of the present invention will now be described with reference to the FIGURES. The description provided herein is for exemplary purposes only and is not intended in any way to limit the scope of the invention. For example, the references to the ZIP and JAZ cartridges herein are merely exemplary and are not intended to limit the invention.

Figure 1:
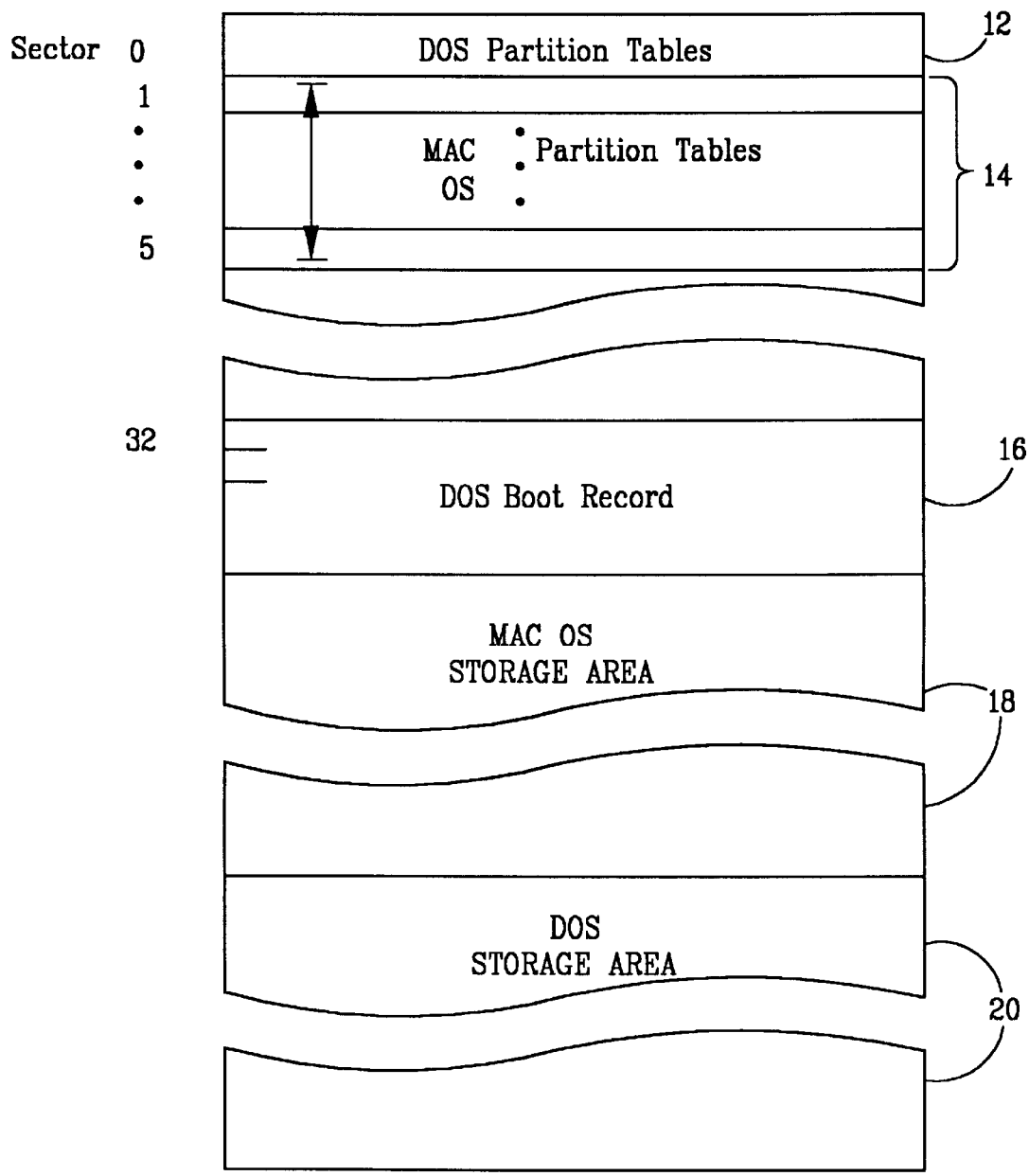
FIG. 1 is a graphical depiction of a prior art dual-format disk structure.

FIG. 1 graphically depicts the prior art dual format disk layout 10 developed by the assignee of the present invention. Such a format could be used, for example, with a ZIP or JAZ drive cartridge. As is described in detail below, this dual format provides the means for simultaneously maintaining critical MAC OS and DOS partition information. Thus, a DOS based computer can read the DOS partition information; whereas, a MAC OS computer can read the MAC OS partition information. Consequently, software programs for each operating systems can co-exist on the same disk. Unfortunately, sector zero 12 was used by DOS and was unavailable for the MAC OS. As a result, a MAC OS driver could not be installed at system start-up.

As is well known, both operating systems have unique sector placement requirements. For example, DOS requires a partition table description in sector zero 12 that points to and describes the partition tables within the boot sector beginning at sector thirty-two 16. The MAC OS, on the other hand, requires partition tables beginning at sector one 14. Because these partition sector requirements can be maintained without overlap, vital partition table information can be maintained for both operating systems on the same disk simultaneously.

According to a further aspect of the dual format, the space required by MAC OS storage area 18 is maintained from the DOS viewpoint as a file. Measures are then taken to hide this file from the perspective of a user on a DOS based computer. For example, the file attributes are set to hidden. On the other hand, a user of a MAC OS based computer has free to access the MAC OS storage area 18.

Whereas DOS maintains partition tables pointed to by sector zero 12, the MAC OS maintains partitions tables beginning at sector one 14—an area unused by DOS. The MAC OS uses these partition tables to divide the disk into a series of partitions. For example, the area on the disk beginning with sector thirty-two, which contains the DOS boot sector, is treated as a reserved partition by the MAC OS. Similarly, the DOS storage area 20 is also maintained as a separate partition by the MAC OS. The remaining MAC OS storage area 18 is allocated as the final partition.

Figure 2:
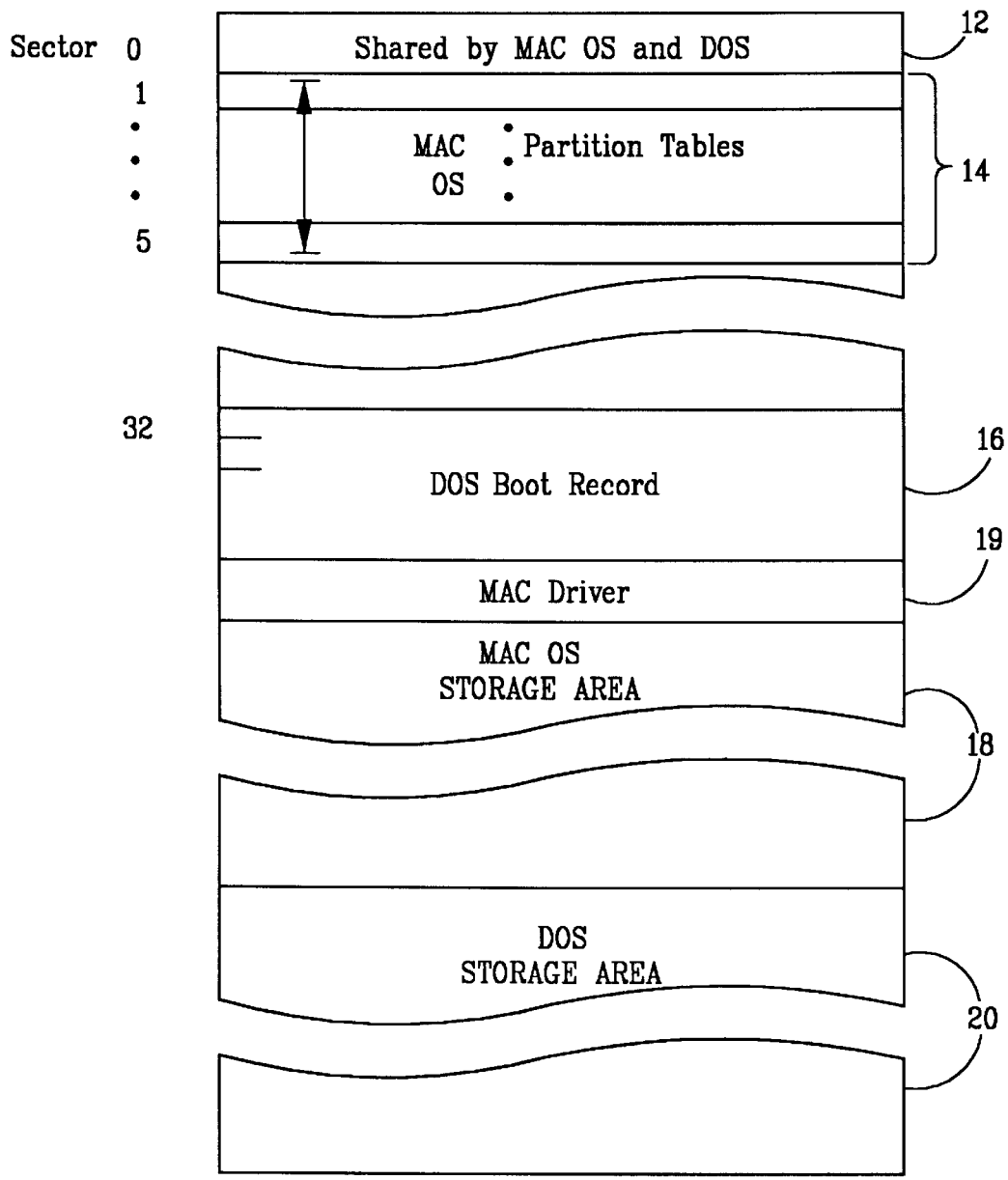
FIG. 2 is a graphical depiction of an improved dual-format disk structure.
Figure 3:
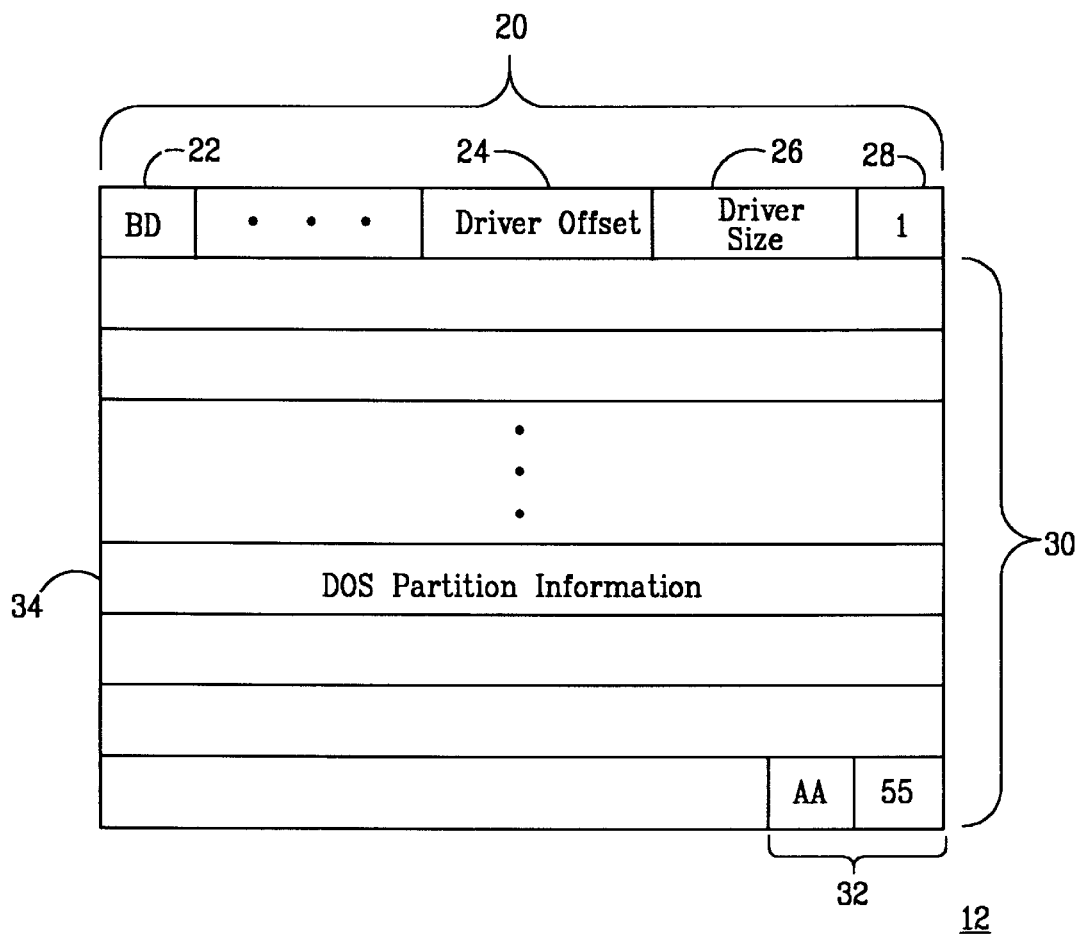
FIG. 3 is a graphical depiction of combined MAC OS and DOS sector zero in accordance with a preferred embodiment of the present invention.

Referring now to FIGS. 2 and 3, an improved dual-format disk 10 is graphically depicted. In the improved dual-format disk, sector zero 12 is shared by both DOS and MAC OS. The division of sector zero is best illustrated in FIG. 3. As shown, the first twenty-six bytes 20 of sector zero 12 is utilized for MAC OS information. The first two of these twenty-six bytes 22 contains the MAC OS required signature "ER" ASCII. Additionally, bytes are reserved for an offset to a driver 24 and the driver size 26. The portions of sector zero 12 after the first twenty-six bytes contains information utilized by DOS. Importantly, the last two bytes of sector zero 12 contains a signature indicating a DOS sector zero. Moreover, DOS partition information 34 is maintained at offset 1BEh within the sector.

As a result of the split sector zero, both DOS and MAC OS can recognize the sector as valid. For DOS based computers, the operating system can recognize the disk during start-up. For MAC OS based computers, the operating system can recognize the sector as indicating that the disk contains a driver. As a result, MAC OS will automatically and properly load the driver 19 pointed to in the sector. Similarly, if a DOS based system accesses the disk, DOS will also recognize the signature as authentic. Thus, the partition tables pointed to by sector zero 12 will be loaded, allowing a user to access the disk.

Figure 4:
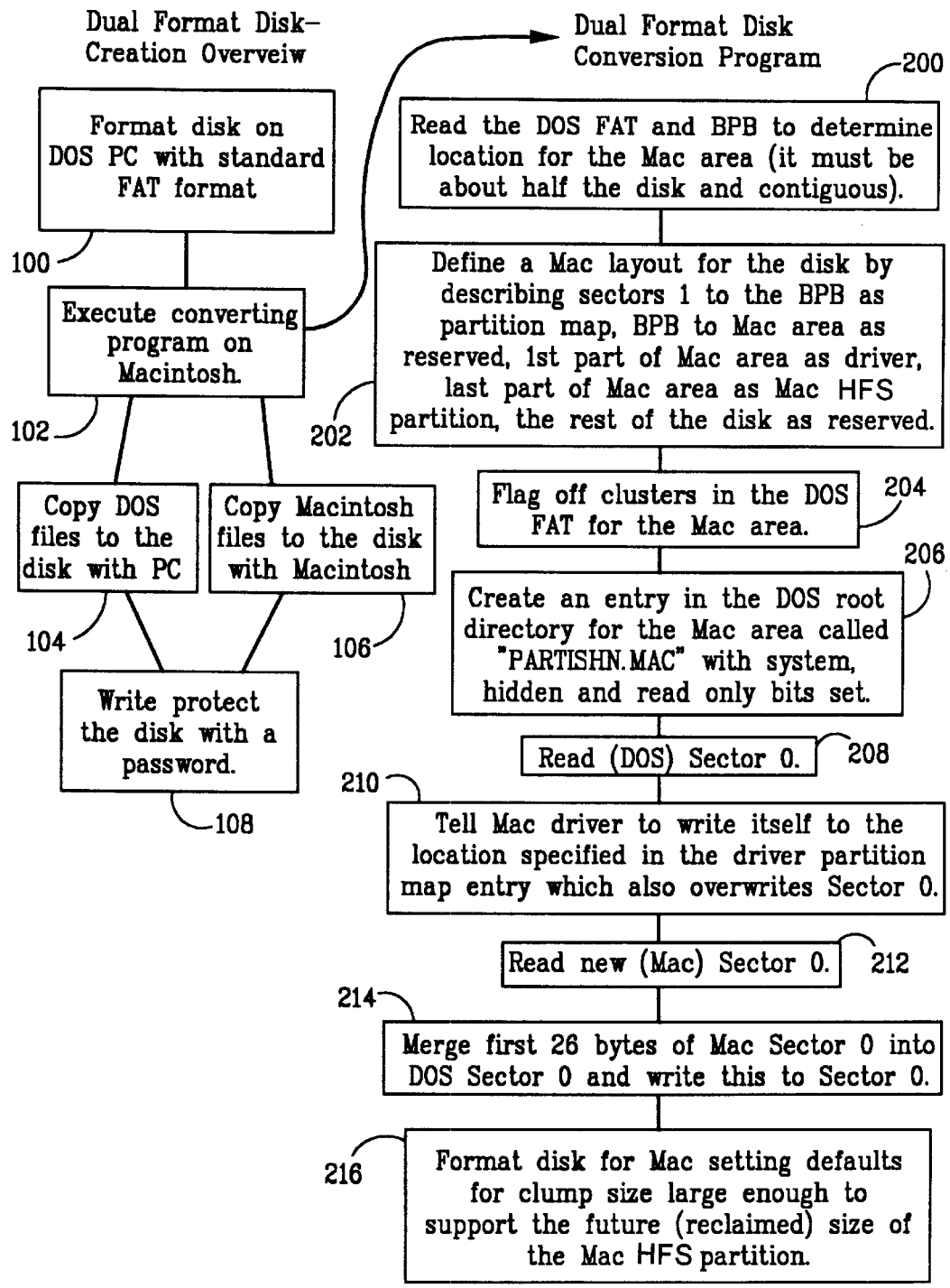
FIG. 4 is a flow chart of the process of creating a dual-format disk in accordance with a preferred embodiment of the present invention.

FIG. 4 presents a flow chart of a preferred embodiment of the process of creating a dual-format disk. Skilled artisans should appreciate that certain aspects of this process could be easily altered without effecting the inventive aspects thereof. For example, although the process contemplates formatting a disk first with the DOS format and then overlaying the MAC OS format, this process could be reversed. That is, the process could be appropriately modified to first put down a MAC OS format and then overlay it with DOS formatting information. In either case, the end result will be the same.

To begin the format process, a disk is inserted into a DOS based computer and formatted with a standard DOS format and file allocation tables (FAT) (step 100). As will be described in further detail below, the disk is then inserted into a MAC OS based computer and a program is executed that merges MAC OS required formatting information with the DOS format information on the disk (step 102). The disk is now ready to have the DOS and MAC OS files, e.g., distribution files, copied to it. The MAC OS files are copied to the disk on the MAC OS based computer and the DOS files are copied to the disk on the DOS based computer (steps 104–106). Again, the order in which the files are copied to the disk is reversible. The disk is then write protected (step 108). (This last step (step 108) is peculiar to ZIP and JAZ cartridges, as currently conventional floppy disks do not support such a function under software control; rather, write protection is performed manually.)

The overlay procedure performed on the MAC OS based computer (i.e., step 102) is further detailed in steps 200–216. Initially, the DOS FAT and boot sector are read to determine a contiguous location which is to be reserved for MAC OS files. According to a presently preferred embodiment, about half of the disk is reserved for the MAC OS files (about 50 Megabytes on a currently available ZIP cartridge). Next, the MAC OS partition information is placed on the disk (step 202). Referring back to FIG. 2, the MAC OS partition information is currently defined as sectors one through five. Sectors one through the beginning of the DOS boot sector, e.g., sector thirty-two, is defined as the partition map (i.e., the partition partition is defined). The DOS boot sector 16 is defined as a reserved partition by the MAC OS. The first part of the MAC OS storage area 18 is defined as a driver. The remaining portion of the MAC OS storage area 18 is defined as a MAC OS Hierarchical File System (HFS). And, the remaining portion of the disk (i.e., the DOS storage area 20) is defined as a reserved partition.

The previous step (202) ensured that the MAC OS would recognize the allocation of the disk between MAC OS and DOS. DOS must also make this distinction. This distinction is accomplished by making the MAC storage area appear to DOS as a file. To that end, clusters in the FAT are allocated to the MAC storage area 18 (step 204). Additionally, an entry is created in the DOS root directory for the MAC storage area 18 in a file named "PARTISHN.MAC." The system, hidden and read only bits are set to enhance the protection of that storage area from inadvertent DOS usage (step 206).

After the storage areas are allocated between MAC OS and DOS, the shared sector zero is created (steps 208–214). Initially, sector zero had been created by DOS. Thus, the MAC OS information remains to be merged with the DOS sector zero. Accordingly, the current (DOS only) sector zero is read from the disk (step 208). The MAC driver is then instructed to copy itself to the location previously specified in the partition map entry for the driver. This instruction causes the driver to overwrite sector zero on the disk (step 210), creating a new sector zero. The new (MAC only) sector zero is read back off of the disk (step 212). The DOS and MAC sectors are then merged by writing the first twenty-six bytes of the MAC sector zero to the DOS sector zero. This new merged sector zero is then copied back to sector zero on the disk (step 214). The clump size is set to support the entire disk size rather than just the MAC OS portion. As a result when the disk is later reclaimed the MAC OS will be able to recognize the entire disk.

After a disk has been dual formatted and MAC OS and DOS versions of software programs are copied to their respective sections of the disk, the disk is ready for distribution. According to a further aspect of the present invention, since only one version of software is installed (MAC OS or DOS) by a user, the space occupied by the other version can be reclaimed. To that end, the disk is returned to a single format (MAC OS or DOS) after a user installs one of the versions of the software program. For example, if a MAC OS user installs the MAC OS version of the software programs on a MAC OS based computer, the install software removes the DOS version of the software program and reclaims the space formerly reserved as DOS storage space for use by the MAC OS user. Similarly, a DOS installation will reclaim the storage space formerly reserved for use by the MAC OS.

Figure 5:
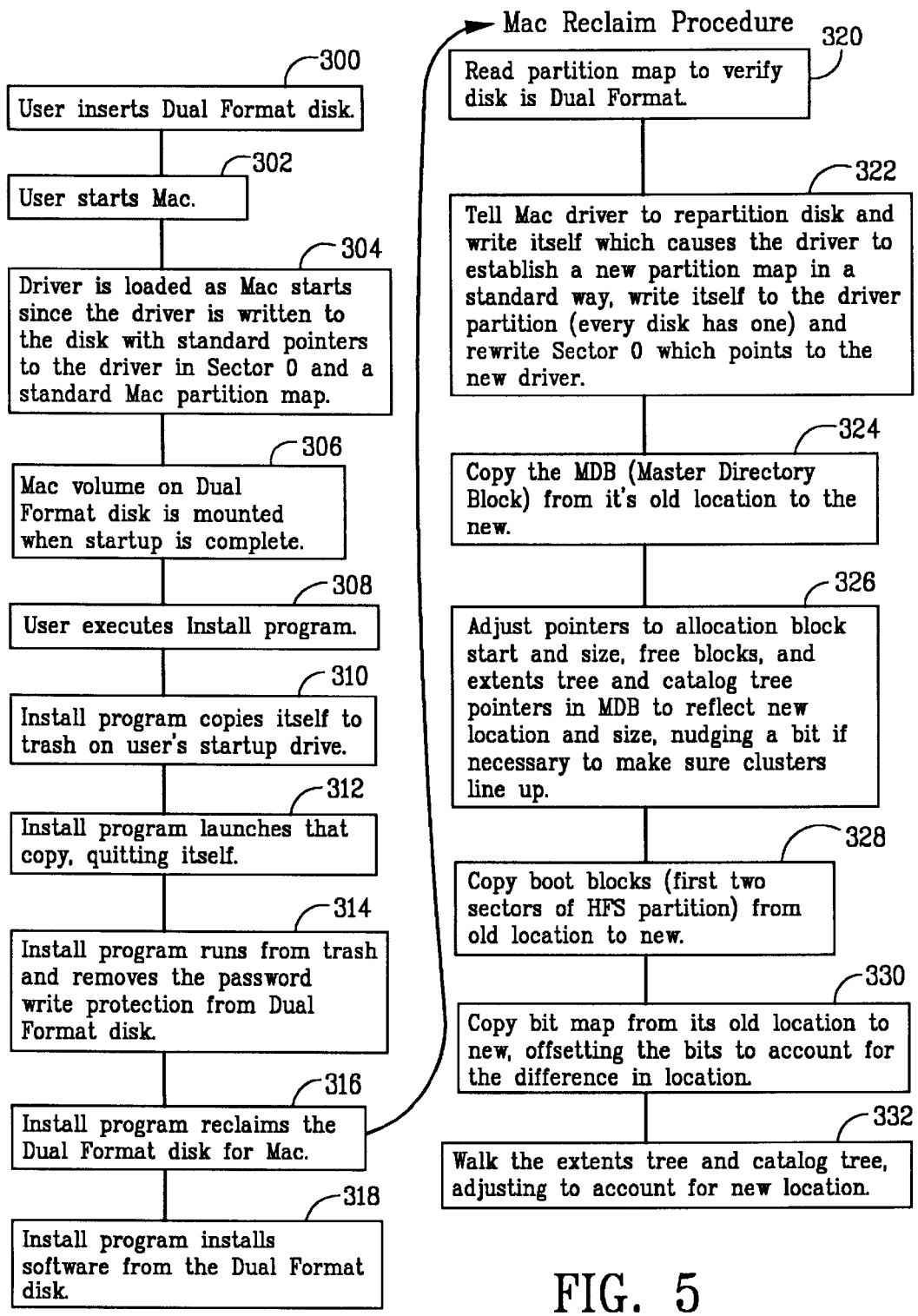
FIG. 5 is a flow chart of the process of installing software from the dual-format disk on a MAC OS based computer and reclaiming the DOS portion of the dual-format disk in accordance with a preferred embodiment of the present invention.

Referring to FIG. 5, a reclamation process flow chart for a MAC OS based computer is presented. To start the reclamation process, the user inserts the dual-format disk and starts the computer (steps 300–302). During the startup sequence, the MAC OS looks in sector zero for driver information. Since the driver had been installed on the disk as described in detail above, the MAC OS will automatically locate and load the driver according to standard MAC OS protocol (step 304). When the startup is completed, the MAC volume on the dual-format disk is mounted, also according to standard MAC OS startup protocol (step 306). The user then executes the install program contained in the MAC OS portion of the dual-format disk (step 308).

According to an aspect of the present invention, a process (referred to hereinafter as "switched launch") is provided that allows the install program to reclaim the DOS storage area from the dual-format disk. This process causes the install program to run from a storage area other than the storage area from which it was initially executed, i.e., launched. This allows the disk to be dismounted before deleting files, moving directories and the like.

Generally, the switched launch is performed by launching the install program from the dual-format disk. The install program then copies itself to trash on the user's startup drive, launches that copy and quits (310–312). The install program, running from the trash volume, removes the write protection from the dual-format disk and reclaims the DOS storage portion for use by the MAC OS (step 314–316).

Figure 7:
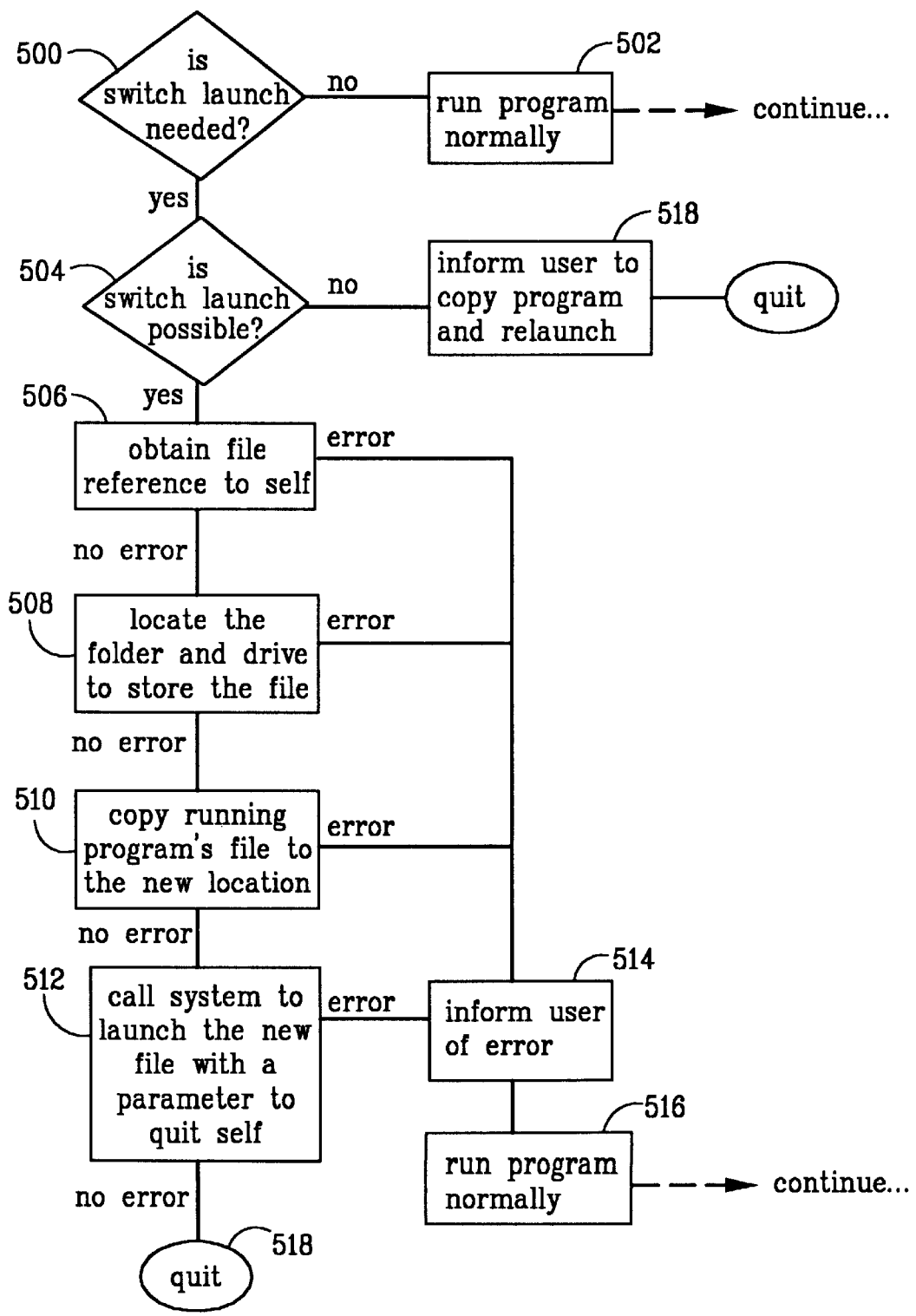

FIG. 7 provides a more detailed flow chart of this switched launch procedure. The process begins by determining whether a switched launch is required (step 500). That is, if the program is running from a different volume than the volume that needs to be reclaimed, no switched launch is required and the program continues normally (step 502). If a switched launch is needed but not possible, e.g., an unsupported operating system version is installed, the memory space is insufficient or the like, no switched launch can be performed and the program must be copied manually (step 504). Thus, the user is informed of the problem and the program quits (step 518). If a switched launch is possible, a file reference to the switched launch program is obtained (step 506). The folder and drive to which the program will be copied is located (e.g., the trash folder on the startup volume) (step 508). Thereafter, the running program's file is copied to the new location (step 510). A system call is made to launch the new copy and the running copy quits (step 512–518). Any errors occurring during steps 506–512 are trapped, and the user is informed of the error condition (step 514).

Referring back to FIG. 5, after the switched launch has occurred, the reclamation process can begin. To start that process, the partition map is read to ensure that this is a dual-format disk (step 320). For example, the partition map should indicate a reserved partition with the label "IOMEGA_RESERVED." After the disk is determined to be a valid dual-format disk, the disk is re-partitioned to remove the DOS reserved partitions. This is accomplished by instructing the driver to repartition the disk, which creates a new partition map, writes the driver to the driver partition, and rewrites sector zero (step 322). Next the Master Directory Block (MDB) is moved to the top of the free space on the disk (this saves time by not moving the entire HFS) (step 324). Of course, the MDB must be moved to the required third sector of the HFS partition. After the MDB is moved, pointers to the allocation block start and size, free blocks, extents tree and catalog tree are adjusted in the MDB to reflect the new MDB location (step 326). Then, the boot blocks and bitmap are moved to the top of the free space on the disk. The bits are offset in the bitmap to reflect the new location (steps 328–330). The extent tree and catalog trees are also adjusted to account for the new location (step 332). Thereafter the disk only contains MAC OS software and file format information, and the reclaimed DOS portion is available for additional MAC OS storage space.

Figure 6:
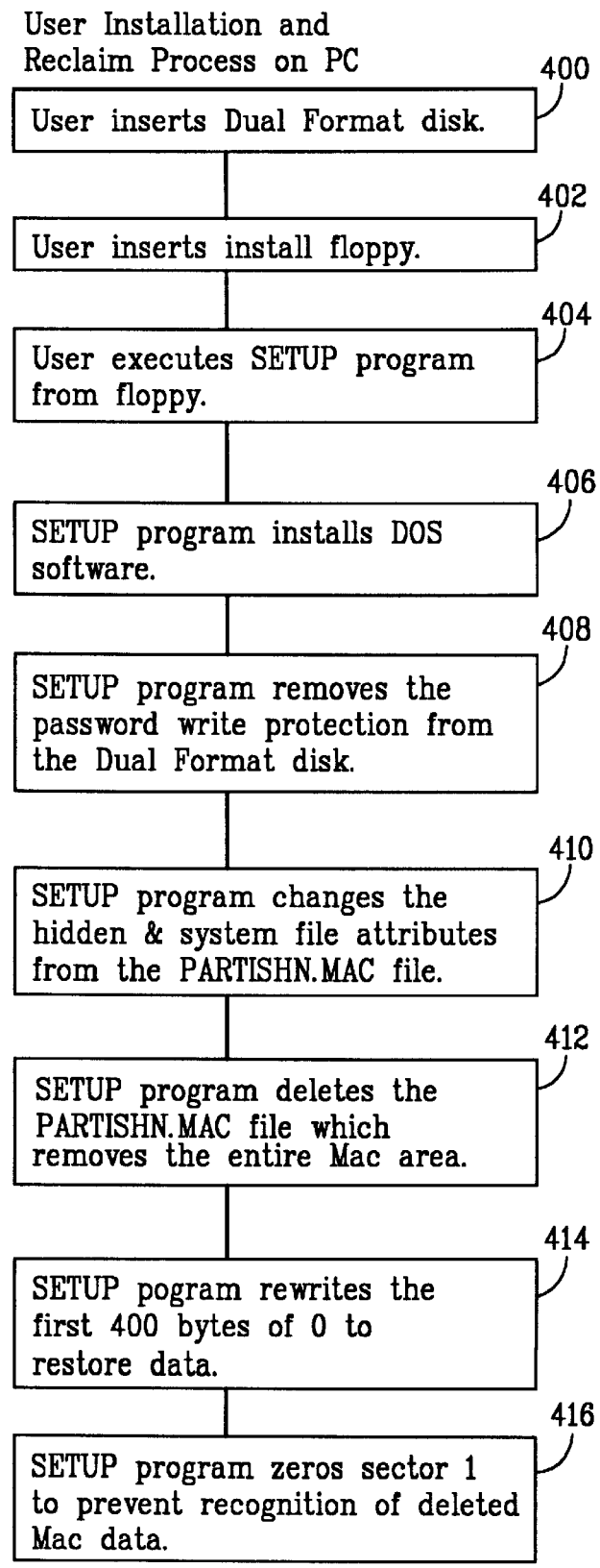
FIG. 6 is a flow chart of the process of installing software from the dual-format disk on a DOS based computer and reclaiming the MAC OS portion of the dual-format disk in accordance with a preferred embodiment of the present invention; and, FIG. 7 is a flow chart of the process of switching the launch storage device during the reclamation process on a MAC OS based computer in accordance with a preferred embodiment of the present invention.

An analogous reclamation procedure occurs on a DOS based computer when a user installs the DOS version of the software program. Referring to FIG. 6, a flow chart of the reclamation process on a DOS based computer is depicted. To start the DOS reclamation process, the user inserts the dual-format disk and a separate floppy disk containing an installation program (step 400–402). Notice that in the present embodiment the DOS process is different from the MAC OS installation process in that two disks are needed. A single disk process could be implemented for the DOS reclamation process; however, additional system software would be needed on the disk. After the disks are properly inserted, the user executes a setup program from the floppy disk (step 404). The setup program then installs the DOS software from the dual-format disk (step 406). The disk is now ready to be reclaimed. Write protection is removed from the dual-format disk (step 408). The file attributes of "PARTISHN.MAC" are changed and the file is deleted (steps 410–412). In order to remove the final traces of the MAC OS, sector zero is rewritten with a normal DOS sector zero (step 414), and sector one is set to zero to prevent a MAC OS machine from recognizing the disk (step 416). When completed, the disk is DOS only format and all of the space, including that formerly occupied by MAC OS files, is useable by DOS.

As the foregoing illustrates, the present invention is directed to methods for sharing a storage medium between operating systems having different file formats. Methods are presented for overcoming the different formats used by MAC OS and DOS by creating a dual format disk. Additionally, methods are presented for returning the disk to a single format after the execution of an installation program on a computer having the desired operating system. Changes may be made to the embodiments described above without departing from the broad inventive concepts thereof. For example, while the method of the present invention is particularly well suited to MAC OS and DOS, similar method may be applied to other operating systems. Moreover, the methods have application to a variety of media, such as floppy disk, CD-ROM and the like. Accordingly, this invention is not limited to the particular embodiments disclosed, but is intended to cover all modifications that are within the scope and spirit of the invention as defined by the appended claims.

What is claimed is:

1. A method of simultaneously storing information from two substantially incompatible operating systems on a removable magnetic medium, comprising:

a) on a computer having a first operating system, generating a first operating system sector such that said sector has a signature recognized by said first operating system, and wherein said first operating system sector has information necessary to locate files on the on the removable magnetic medium;

b) on a computer having a second operating system, generating a second operating system sector such that said sector has a signature recognized by said second operating system and other information used by said second operating system;

c) merging said first operating system sector with said second operating system sector into a dual-format sector;

d) writing said dual-format sector to said removable magnetic medium such that said removable magnetic medium is automatically recognized by a computer having any one of the incompatible operating systems if the medium is installed during system startup;

e) storing information into files on said removable magnetic medium of a first format recognized by one of said first and said second operating system; and f) storing information into files on said removable magnetic medium of a second format recognized by an other one of said first and said second operating system.

2. The method as recited in claim 1, wherein said first operating system is DOS.

3. The method as recited in claim 2, wherein the DOS recognized signature is located in the last two bytes of dual-format sector.

4. The method as recited in claim 1, wherein said second operating system is MAC OS.

5. The method as recited in claim 4, wherein said MAC OS recognized signature is located in the first two bytes of said dual-format sector.

6. A disk cartridge for use in a disk drive of the type that accepts a removable cartridge, comprising:

a magnetic storage medium;

a first partition table compatible with a first operating system;

at least one program of a first type configured to execute on said first operating system, said program of said first type being stored in an area referenced by said first partition table;

a second partition table compatible with a second operating system;

at least one program of a second type configured to execute on said second operating system, said program of said second type being stored in an area referenced by said second partition table; and, a first sector containing a first signature recognized by said first operating system and a second signature recognized by said second operating system, said sector enabling said disk to be automatically recognized by either one of said first operating system and said second operating system during system startup.

7. A disk as recited in claim 6 wherein said first operating system comprises one of said MACINTOSH operating system or said DOS operating system.

8. A disk as recited in claim 6 wherein said second operating system comprises on of said MACINTOSH operating system or said DOS operating system.

9. A disk as recited in claim 6 wherein said first sector is sector zero.

10. A disk as recited in claim 6 wherein said first sector contains a reference to a program that is executed during operating system startup.

11. A disk as recited in claim 10 wherein said program is of a type that converts said disk from one containing said first and second partition tables to one containing only one of said first partition table and said second partition table.

* * * * *